(12) United States Patent
Vihar et al.

(10) Patent No.: US 9,384,012 B2
(45) Date of Patent: Jul. 5, 2016

(54) STANDALONE DATA ENTRY FOR BACKEND SYSTEM

(75) Inventors: Sathish Babu Krishna Vihar, Bangalore (IN); Dinu Pavithran, Kodungallore (IN); Christoph Birkenhauer, Wiesloch (DE); Juergen Sattler, Wiesloch (DE)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 13/328,892

(22) Filed: Dec. 16, 2011

(65) Prior Publication Data

US 2013/0159871 A1 Jun. 20, 2013

(51) Int. Cl.
| | |
|---|---|
| G06F 3/00 | (2006.01) |
| G06F 9/44 | (2006.01) |
| G06F 17/24 | (2006.01) |
| G06Q 30/06 | (2012.01) |

(52) U.S. Cl.
CPC ............ G06F 9/4443 (2013.01); G06F 17/243 (2013.01); G06Q 30/0611 (2013.01)

(58) Field of Classification Search
CPC .......................... G06F 3/0481; G06F 17/30867
See application file for complete search history.

(56) References Cited

U.S. PATENT DOCUMENTS

| | | | | |
|---|---|---|---|---|
| 7,313,757 | B2* | 12/2007 | Bradley | G06F 17/243 715/222 |
| 8,667,383 | B2* | 3/2014 | Schnitt | G06F 17/2288 709/201 |
| 2003/0009392 | A1* | 1/2003 | Perkowski | G06F 17/30879 705/14.51 |
| 2003/0200254 | A1* | 10/2003 | Wei | G06F 9/4443 709/203 |
| 2006/0004927 | A1* | 1/2006 | Rehman | G06F 17/30861 709/250 |
| 2006/0095447 | A1* | 5/2006 | Dickinson | G06F 17/246 707/999.1 |
| 2006/0161646 | A1* | 7/2006 | Chene | G06F 17/243 709/223 |
| 2006/0235764 | A1* | 10/2006 | Bamborough | G06Q 30/02 705/14.36 |
| 2008/0098291 | A1* | 4/2008 | Bradley | G06F 17/243 715/223 |
| 2008/0189622 | A1 | 8/2008 | Sanchez et al. | |
| 2009/0171679 | A1* | 7/2009 | Salgado | G06Q 30/0281 705/346 |
| 2010/0241978 | A1* | 9/2010 | Genovese | G06F 9/4443 715/765 |
| 2010/0299389 | A1* | 11/2010 | Boyer | G06F 17/2229 709/203 |
| 2012/0089841 | A1* | 4/2012 | Boyer | G06F 21/64 713/175 |

OTHER PUBLICATIONS

"InfoPath 2010 Features and Benefits", 2010, Office.com, retrieved Dec. 16, 2011, retrieved from https://...microsoft.com/...infopath-2010-features-and-benefits-HA101806949.aspx, 3pgs.

Technical Whitepaper, "Interactive Forms based on Adobe Software", copyright 2004 Adobe Systems Incorporated, 12pgs.

(Continued)

*Primary Examiner* — Hua Lu
(74) *Attorney, Agent, or Firm* — Buckley, Maschoff & Talwalker LLC

(57) ABSTRACT

A computer-implemented system may include reception of a user interface package at a client device, the user interface package including layout information and a data model, the layout information conforming to a user interface model of a backend service provider and the data model conforming to a business object model of the backend service provider. The layout is rendered at the client device based on the user interface model, data input to the rendered layout at the client device is received, the data is stored at the client device in conformance with the business object model, and the data is transmitted from the client device to the backend service provider.

15 Claims, 12 Drawing Sheets

(56) References Cited

OTHER PUBLICATIONS

Microsoft Corporation, "Extending Enterprise Applications with Microsoft Outlook: Architectural Design Guide", Jan. 2006, bSNDOCID: XP55028225, Retrieved from the Internet, retrieved on May 25, 2012, 15pgs.

European Patent Office, "Communication: The Extended European Search Report", Aug. 27, 2013, for European Application No. 12008138.5-1954 / 2624128, 8pgs.

\* cited by examiner

RFQ_InteractiveForm.uip

File    Edit    Tools    Help

Request for Quotation
Acme Heating Technologies, Inc.
1123 Main Street
Akron, OH  44306

[ Send ]  [ Save ]  [ Close ]  |  [ Sign ]

Miller and Son
2576 Ashland Ave.
Green Bay, WI  54304

Quote ID:        New_Quote
RFQ ID:          1851
Published On:    7/15/2011
Contact Person:  Peter Greene
Phone:           +1 (505) 733-9498
Email:           ap_srn_not_maintained@sap.corp

Subject: RFQ for Contract Large

Dear Sir or Madam,

You are invited to submit a quote for the products in the attached request for quotation (RFQ), in accordance with the general RFQ requirements listed here.

General Requirements

| | | | |
|---|---|---|---|
| Submission Deadline: | 1851 | Quote required for all items: | Yes |
| Quote Valid Until: | 7/15/2011 | Bidder can change quote: | No |
| RFQ Type | Peter Greene | Bidder can add items: | No |
| Currency | +1 (505) 733-9498 | | |

| Product ID | Product Description | Category | Reqstd. Qty. | Offered Qty. | Requested Value | Offered Value | Price |
|---|---|---|---|---|---|---|---|
| MCR-0004 | T-IRON | Metals | 20.0 lb | | 10.00 USD | | |
| MCR-0004 | GREY CAST IRON CYLINDER | Metals | 20.0 lb | | 10.00 USD | | |
| MCR-0004 | GREY CAST IRON CYLINDER | Metals | 2.0 lb | | 10.00 USD | | |
| MCR-0004 | T-IRON | Metals | 1.0 lb | | 4.00 USD | | |
| MCR-0004 | T-IRON | Metals | 2.0 lb | | 10.00 USD | | |
| MCR-0004 | Marketing Strategy Corporate | Marketing | 1 | | 2.00 USD | | |

*FIG. 5*

RFQ_InteractiveForm.uip

File    Edit    Tools    Help

Request for Quotation

Acme Heating Technologies, Inc.
1123 Main Street
Akron, OH 44306

[Send] (520)   [Save] (510)   [Close] (530)   |   [Sign] (540)

Miller and Son
2576 Ashland Ave.
Green Bay, WI 54304

Subject: RFQ for Contract Large

Dear Sir or Madam,

| | |
|---|---|
| Quote ID: | New_Quote |
| RFQ ID: | 1851 |
| Published On: | 7/15/2011 |
| Contact Person: | Peter Greene |
| Phone: | +1 (505) 733-9498 |
| Email: | ap_srn_not_maintained@sap.corp |

You are invited to submit a quote for the products in the attached request for quotation (RFQ), in accordance with the general RFQ requirements listed here.

General Requirements

| | | | |
|---|---|---|---|
| Submission Deadline: | 1851 | Quote required for all items: | Yes |
| Quote Valid Until: | 7/15/2011 | Bidder can change quote: | No |
| RFQ Type | Peter Greene | Bidder can add items: | No |
| Currency | +1 (505) 733-9498 | | |

| Product ID | Product Description | Category | Reqstd. Qty. | Offered Qty. | Requested Value | Offered Value | Price |
|---|---|---|---|---|---|---|---|
| MCR-0004 | T-IRON | Metals | 20.0 lb | 20.0 lb | 10.00 USD | 10.00 USD | 10.00 lb |
| MCR-0004 | GREY CAST IRON CYLINDER | Metals | 20.0 lb | 20.0 lb | 10.00 USD | 10.00 USD | 20.00 lb |
| MCR-0004 | GREY CAST IRON CYLINDER | Metals | 2.0 lb | 2.0 lb | 10.00 USD | 10.00 USD | 30.00 lb |
| MCR-0004 | T-IRON | Metals | 1.0 lb | 1.0 lb | 4.00 USD | 4.00 USD | 4.00 lb |
| MCR-0004 | T-IRON | Metals | 5.0 lb | 3.0 lb | 10.00 USD | 12.00 USD | 4.00 lb |
| MCR-0004 | Marketing Strategy Corporate | Marketing | 7 | 7 | 2.00 USD | 2.00 USD | -------- |

*FIG. 6*

STANDALONE DATA ENTRY FOR BACKEND SYSTEM

FIELD

Some embodiments relate to enterprise services provided by a backend system. More specifically, some embodiments relate to systems to facilitate the submission of data to a backend system.

BACKGROUND

According to a service-oriented architecture, a backend service layer provides services (i.e., business functionality) to service consumers, typically via Web protocols. A service consumer, such as a user interface client application, may use this business functionality to provide user interfaces for accessing data from and submitting data to the backend service layer.

A user interface designer defines such online user interfaces based on predefined screen layout patterns. More specifically, user interfaces are defined by adding user interface elements to these screen layout patterns and binding the user interface elements to data fields of services offered by the backend service layer. This binding facilitates the transmission of data to and from the backend service layer. The user interfaces are rendered on the client side by user interface runtime code which executes, for example, within a Web browser.

Therefore, a connection to the backend service layer is required in order to use these user interfaces to submit data to the backend service layer. Systems are desired to facilitate the use of thusly-defined user interfaces while disconnected from a corresponding backend service layer, and to subsequently transmit data input to the user interfaces to the backend service layer.

BRIEF DESCRIPTION OF THE DRAWINGS

FIG. 5 is an illustration of a form according to some embodiments.

FIG. 6 is an illustration of a form including user-inputted data according to some embodiments.

DETAILED DESCRIPTION

Figure 1:
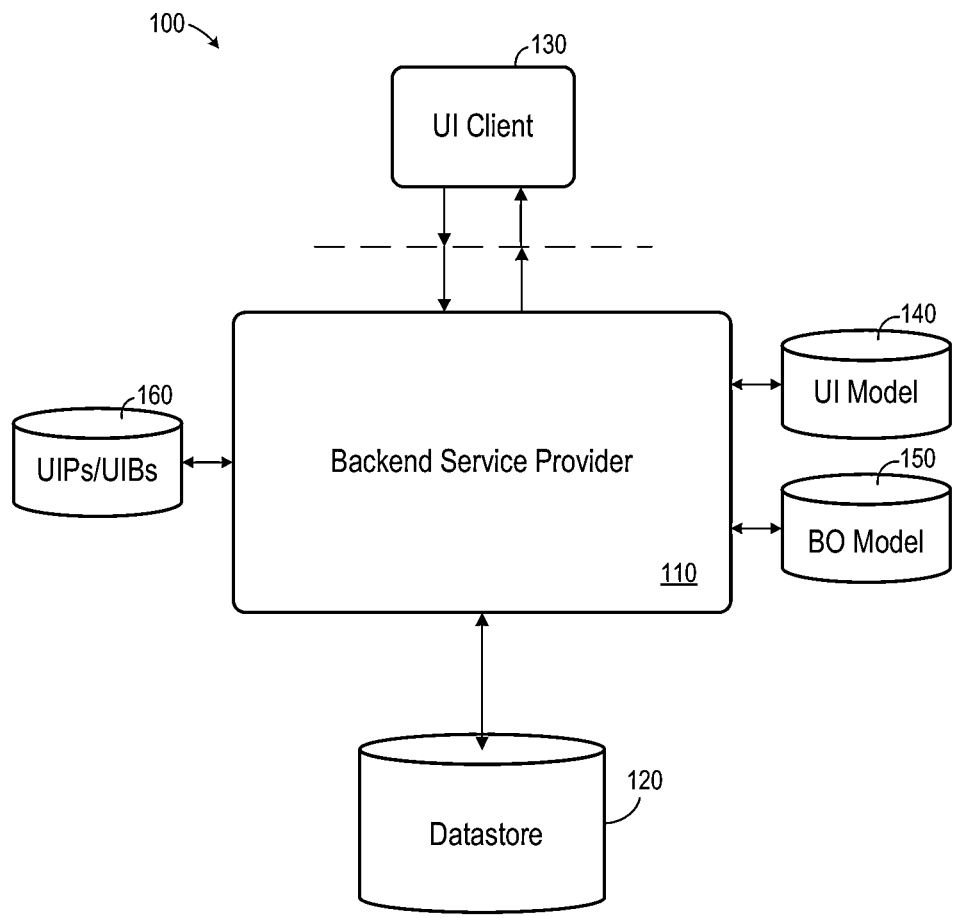
FIG. 1 is a block diagram of a system according to some embodiments.

FIG. 1 is a detailed block diagram of system 100 according to some embodiments. System 100 includes backend service provider 110, datastore 120, and user interface (UI) client 130. Also shown are metadata defining UI model 140 and business object model 150, and UI Packages (UIPs)/UI Bundles (UIBs) 160. FIG. 1 represents a logical architecture for describing some embodiments, and actual implementations may include more or different components arranged in any manner.

Backend service provider 110 may comprise an enterprise services infrastructure and/or any implementation for providing services according to a service-oriented architecture paradigm. The primary entities of backend service provider 110 are "business objects", which are software models representing real-world entities involved in business transactions. For example, a business object may represent a business document such as a sales order, a purchase order, or an invoice. A business object may also represent master data objects such as a product, a business partner, or a piece of equipment. Particular documents and master data objects (e.g., SalesOrder SO4711, ACME corporation) are represented by instances of their representing business object, or business object instances. Business objects expose their data in a complex, normalized data tree which consists of nodes containing attributes, actions (executing business logic on a node) and associations to other nodes.

As described above, backend service provider 110 may provide services to one or more service consumers. The services are provided by executing processes conforming to business object model 150. According to the illustrated embodiment, the services may include retrieving, creating, modifying and/or deleting the data of business object instances stored in datastore 120. Datastore 120 may comprise any one or more systems to store business data. Such systems include, but are not limited to, relational database systems, Online Analytical Processing (OLAP) database systems, data warehouses, application servers, and flat files.

UI client 130 comprises an application to render user interfaces which were designed based on UI model 140. For example, various UI elements provided by UI client 130, such as drop-down menus, trees, fact sheets, each conform to UI model 140. That is, specific drop-down menus, etc. provided by UI client 130 are instances of their corresponding objects defined in UI model 140. UI model 140 may be particularly suited to implementation of a user interface. For example, a user interface implementation is typically concerned only with user interaction and exposure of data and events on the user interface. In contrast, little or no business logic needs to modeled within UI model 140.

According to some embodiments, and as illustrated by the dashed line of FIG. 1, UI client 130 is located at a client or user site, while the other elements of system 100 are housed at a provider site and may provide services to other UI clients located at the same or another user site. The other elements need not always be accessible to UI client 130. That is, UI client 130 may operate in an "offline" mode.

Figure 2:
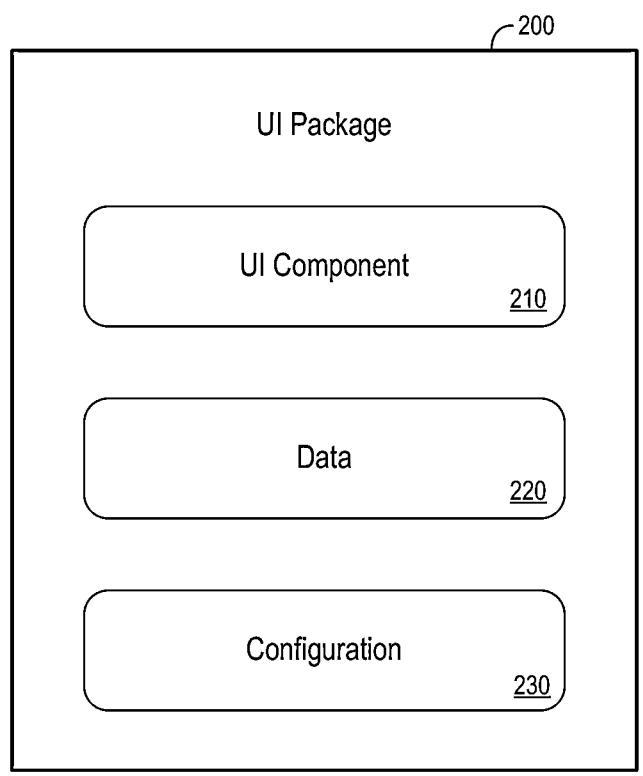
FIG. 2 is a block diagram of a user interface package according to some embodiments.

UIPs/UIBs 160 are packages defining forms/interfaces according to UI model 140 and BO model 150. UIPs/UIBs 160 may represent forms and/or user interfaces designed by a designer and may be generated by backend service provider 110. FIG. 2 is a block diagram of UI package 200 according to some embodiments. UI package 200 includes UI component 210, data 220 and configuration 230.

UI component 210 may include layout information and a data model. The layout information may comprise UI components designed by a user interface designer based on UI model 140. Since "online" interfaces are also based on UI model 140, the tools and runtime used to generate and render the online interfaces may be used to generate and render the form/interface associated with UI package 200.

The data model of UI component 210 may be designed against a Message Type business object defined by BO model 150. Specifically, the schema of the data model is generated from the inbound service interface message type (i.e., an instance of the Message Type business object) and the UI components are bound to elements of this message type. Data 220 conforms to the data model, and may include default data. Data entered by a user into a form/interface defined by UI package 200 is stored in data 220 and extracted therefrom when received by backend service provider 110. Code lists, images (e.g., brand logo) and other information may be stored in data 220.

Configuration 230 defines elements that identify the visual configuration, etc. These files may also define branding.

UI package 200 may be package according to the Open XML Package Convention (OPC). The OPC enables packaging of XML and non-XML parts into a single file and describing the relationships between each part. UI package 200 may be digitally signed as per the OPC.

UI package 200 may also include a file definition to facilitate reading thereof. For example, UI component 210 may be composed of multiple .uicomponent files, requiring identification of the root uicomponent file. The definition may comprise an XML file as shown below:

```
<UIPDefinition>
    <Components>
        <Component type="Root">IF_RequestForQuotation.uicom-
            ponent</Component>
    </Components>
    <DataSet>
        <Data type="Primary">data.xml</Data>
    </DataSet>
    <Configuration>
        <Property name="SETTINGS">oberon_settings.js</Property>
        <Property name="VISUAL">visualconfig.vcfg</Property>
    </Configuration>
</UIPDefinition>
```

Figure 3:
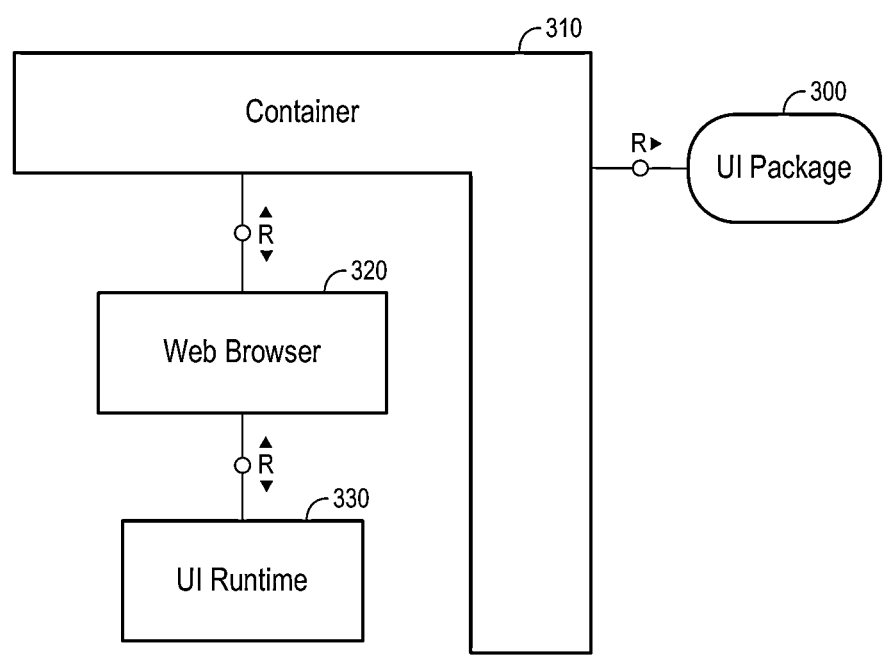
FIG. 3 is a block diagram of a software architecture according to some embodiments.

FIG. 3 is a block diagram of an architecture of UI client 130 according to some embodiments. The architecture may be employed to render and complete a form defined by a UI package received from backend service provider 110, such as UI package 300. Container 310 hosts Web browser 320, which in turn hosts UI runtime 330. Container 310 may comply with the Windows Presentation Formatting protocol in some embodiments. UI runtime 330 may comprise code executable by a virtual machine of Web browser 320 to render a layout defined by UI package 300 based on UI model 140. Accordingly, UI runtime 330 may reuse existing code which is already employed by clients to render interfaces based on UI model 140 in an online mode. In some embodiments, UI runtime 330 is a Silverlight assembly (XAP file) which uses a JavaScript bridge to interact with UI package 300 via container 310.

Figure 4:
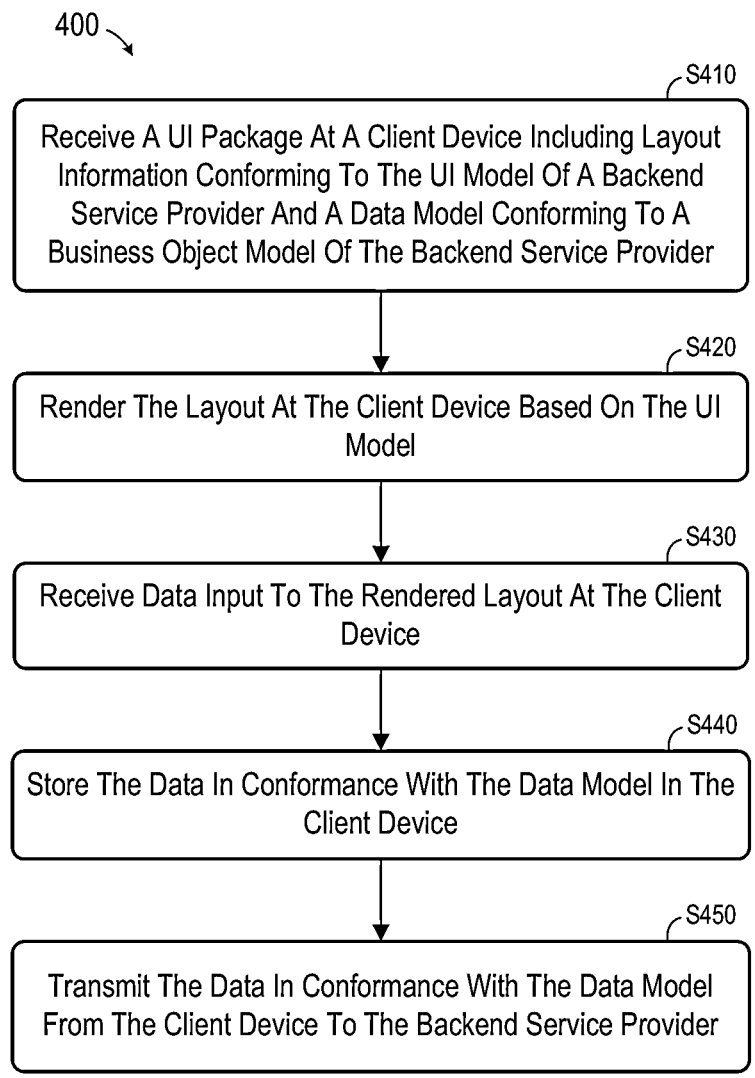
FIG. 4 is a flow diagram of process steps according to some embodiments.

FIG. 4 comprises a flow diagram of process 400 according to some embodiments. In some embodiments, a client device executes program code to perform process 400. All processes mentioned herein may be embodied in processor-executable program code stored on one or more non-transitory computer-readable media, such as a fixed disk, a floppy disk, a CD-ROM, a DVD-ROM, a Flash drive, and a magnetic tape. In some embodiments, hard-wired circuitry may be used in place of, or in combination with, program code for implementation of processes according to some embodiments. Embodiments are therefore not limited to any specific combination of hardware and software.

Initially, at S410, a UI package is received at a client device. As described above, the UI package includes layout information conforming to a UI model of a backend service provider and a data model conforming to a BO model of the backend service provider.

A UI package may be attached, as a file, to an electronic mail message and transmitted to a user's e-mail account prior to S410. The user then accesses his e-mail account from the client device to receive the UI package at the client device. The message may be created and transmitted by backend service provider 110, by a customer of backend service provider 110, or by any other entity. According to one example, a manufacturer sends an e-mail to one or more suppliers including a UI package representing a Request For Quote (RFQ) form.

Next, at S420, the layout is rendered at the client device based on the UI model. According to some embodiments, the file extension .uip is registered for container 310 when container 310 is installed in the client device. The received UI package appears as a file in the file system with the extension .uip. The user may double-click on an icon representing the file to load the UI package into container 310. Container 310 parses the individual parts of the UI package based on the definition included therein. Container 310 then loads UI runtime 330 by providing the UI component(s) and data files of the UI package as input via a JavaScript bridge, and as a result of a call back from UI runtime 330. Any subsequent data operation (e.g., read, update) occurs directly to the UI package via the bridge.

FIG. 5 is a view of form 500 which is rendered at S420 and displayed by a client device according to some embodiments. Embodiments are not limited to forms of any particular appearance, layout or function. Form 500 reflects layout information as well as data from the data portion of the UI package. According to the illustrated example, the company Acme Heating Technologies has transmitted the UI package to the company Miller and Son. A client device at Miller and Son was then operated to open the UI package, resulting in the display of form 500.

Returning to process 400, data is input to the rendered layout and is received at S430. FIG. 6 shows form 500 after the input of data into the columns Offered Qty, Offered Value and Price. More specifically, a user has operated the client device at Miller and Son to input the data into these columns. It is assumed that the user then selects Save control 510.

In response, the input data is stored in the client device at S440. The data is stored in conformance with the data model of the UI package. For example, the data may be stored within data 220 of the opened UI package according to the schema and mapping specified in UI component 210.

The user may also select Send control 520 to transmit the data in conformance with the data model to the backend service provider at S450. Such operation may include invoking an email client of the client device and using the email client to create an electronic mail message addressed to the backend service provider (e.g., ap_sm_not_maintained@sap.corp), attach the UI package including the input data to the message, and transmit the message to the backend service provider.

Alternatively, the user may select Close control 530 to dismiss form 400 before or after saving the input data. In the illustrated example, the user may select Sign control 540 to digitally sign the UI package as mentioned above.

The Save, Send and Sign operations may be rendered by UI runtime 330 instead of container 310. Such an implementation provides the user with a behavior and a visual appearance which is consistent with the online experience. Each operation in this case could have a corresponding service operation in container 310 and would be invoked by UI runtime 830 via the JavaScript bridge.

Upon receipt of the message as described above, the backend service provider may extract the data and process the data as an incoming message. With respect to the present example, the backend service layer may execute services to create a quote including the data. Advantageously, extraction and processing of the data proceeds based on the BO model of the backend service layer, and the quote may be created using code which already exists to support the online mode described above.

Moreover, some embodiments of process 400 provide forms/interfaces of the backend service layer to non-users of the backend service layer, while leveraging existing tools and runtime used to generate and render corresponding online forms/interfaces.

Figure 7:
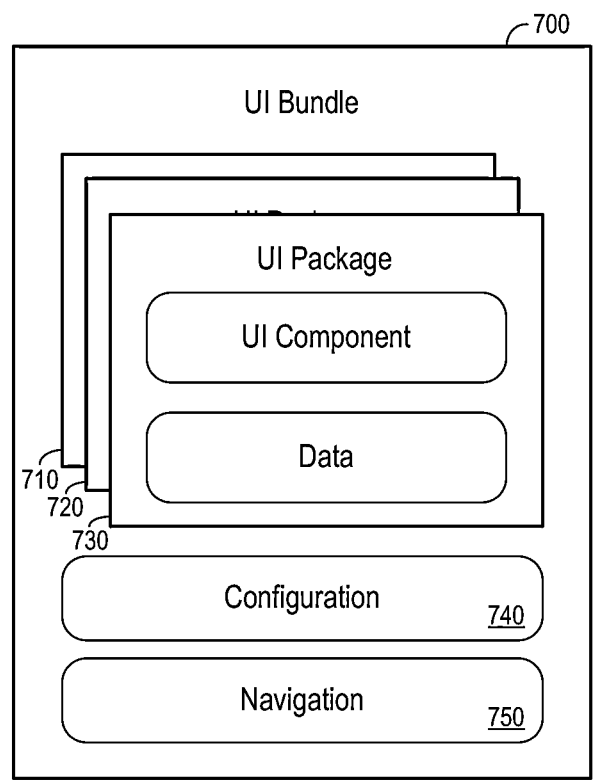
FIG. 7 is a block diagram of a user interface bundle according to some embodiments.

FIG. 7 is a block diagram of UI bundle 700 according to some embodiments. UI bundle 700 includes UI packages 710, 720 and 730 as described above, with the configuration information of each of UI packages 710, 720 and 730 being consolidated into a single configuration 740. Also included is navigation 750, which describes the structural relationships between UI packages 710, 720 and 730. An appropriate container may therefore use navigation 750 to display this structure or to provide navigation between the UI packages 710, 720 and 730. UI bundle 700 may comprise a ZIP file packaged according to the OPC as described above.

Figure 8:
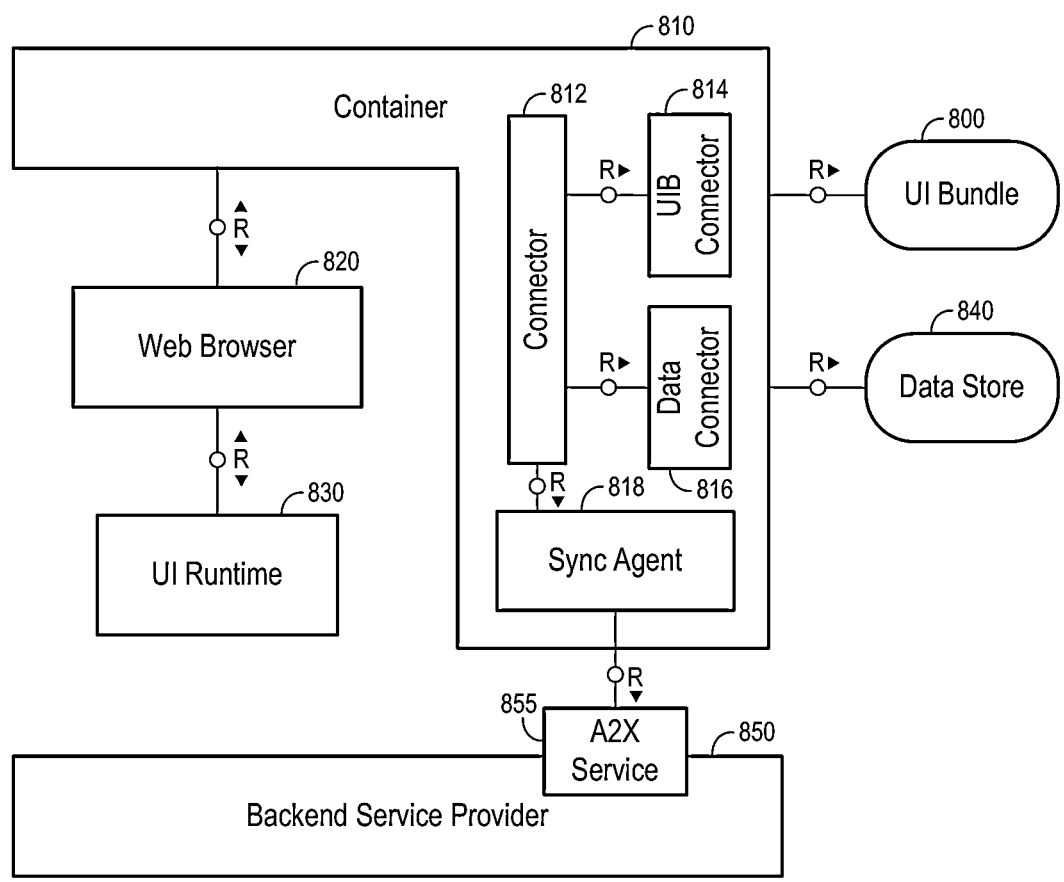
FIG. 8 is a block diagram of a software architecture according to some embodiments.

FIG. 8 is a block diagram of an architecture of UI client 130 according to some embodiments. The architecture may be employed to render and input data to one or more interfaces defined by a UI bundle received from backend service provider 110, such as UI bundle 700. The FIG. 8 architecture may allow a user to embed forms/interfaces into a known host application, so that they may be viewed and completed using the look and feel of the host application.

As described with respect to FIG. 3, container 810 hosts Web browser 820, which in turn hosts UI runtime 830. Container 810 may comprise a Windows Presentation Formatting client, an application add-in (e.g. in some embodiments, container 810 comprises a Microsoft Outlook add-in), or any other suitable host application. In this regard, connector 812 provides communication between the host application and UIB connector 814, data connector 816 and sync agent 818, which may be generic to more than one type of host application.

In operation, container 810 loads UI bundle 800 and processes the UI packages therein based the UI definition therein. In some embodiments, container 810 only reads data from UI bundle 800 but does not write any data to bundle 800. Rather, any data input to interfaces defined by the included UI packages is written to local data store 840 in conformance to the data model of the corresponding UI package.

Various characteristics of local data store 840 may vary based on the implementation of container 810. If container 810 is a Microsoft Outlook add-in, the local .pst file may implement the local data store. When online, sync agent 818 sends the data from data store 840 to backend service provider 850 via a service interface (e.g., A2X service 855).

Figure 9:
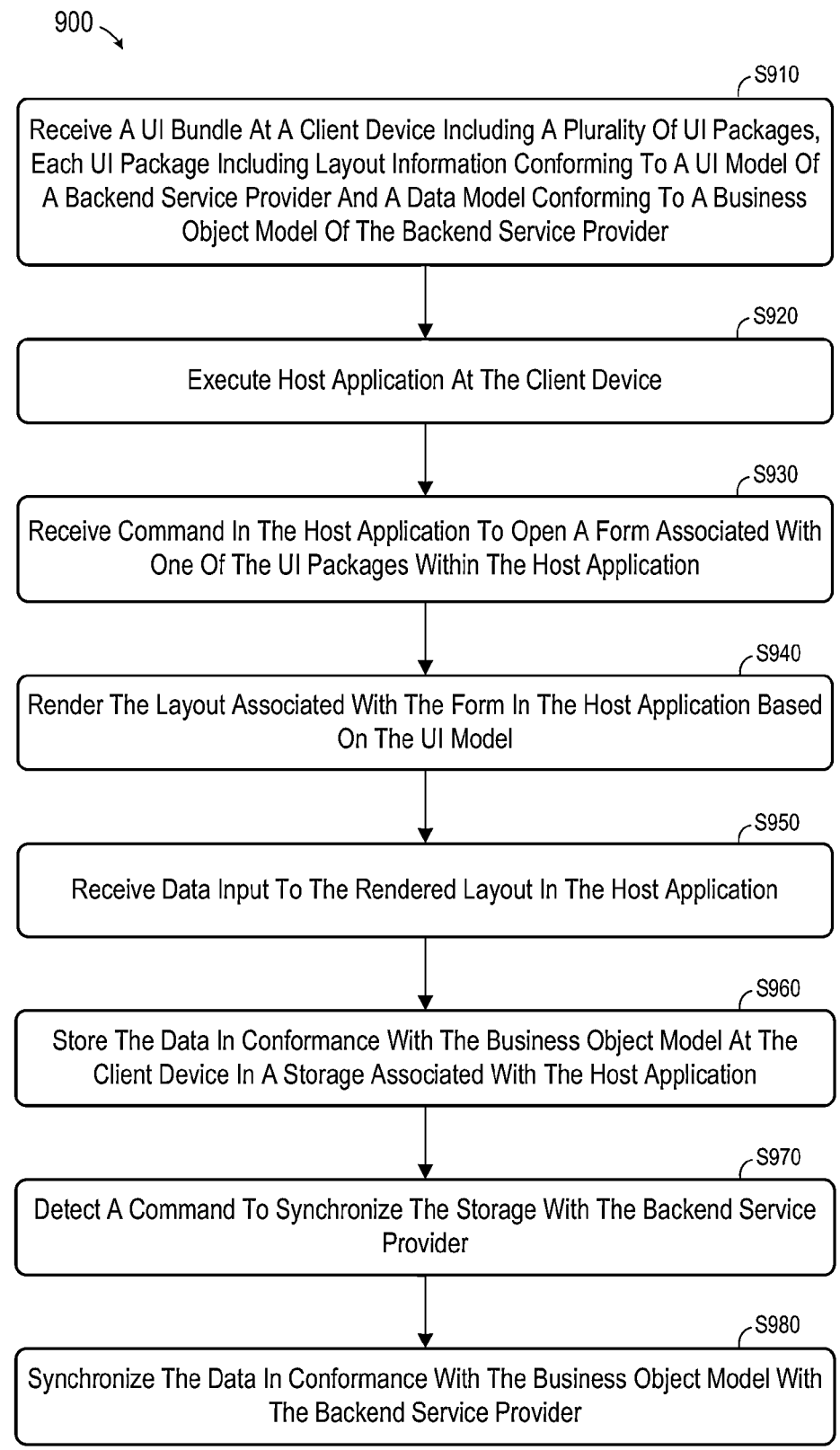
FIG. 9 is a flow diagram of process steps according to some embodiments.

FIG. 9 comprises a flow diagram of process 900 according to some embodiments. A client device may implement the architecture of FIG. 8 and execute program code to perform process 900, but embodiments are not limited to either possibility.

A UI bundle is received at a client device at S910. As described above, the UI bundle includes several UI packages as well as navigation information. Each UI package includes layout information conforming to a UI model of a backend service provider and a data model conforming to a BO model of the backend service provider.

In one example, a user operates the client device to download the UI bundle from a repository provided by a backend service layer. More specifically, the user may select a hyperlink to download a bundle of Microsoft Outlook-compatible interfaces related to sales functions. This bundle may include a corresponding UI package for each of an Accounts form, an Opportunity form, a Sales Order form, and a Time Administration form. The received UI bundle may be stored as UI bundle 800.

A host application is executed at the client device at S920. For example, the user may select an icon to launch Microsoft Outlook at S920, causing display of its main interface. The interface may be augmented by elements provided by container 810 to facilitate the use of UI bundle 800. Next, and perhaps in conjunction with such augmented elements, a command is received at S930 in the host application to open a form associated with one of the UI packages within the host application. In response, at S940, the layout associated with the form is rendered at the client device based on the UI model.

Figure 10:
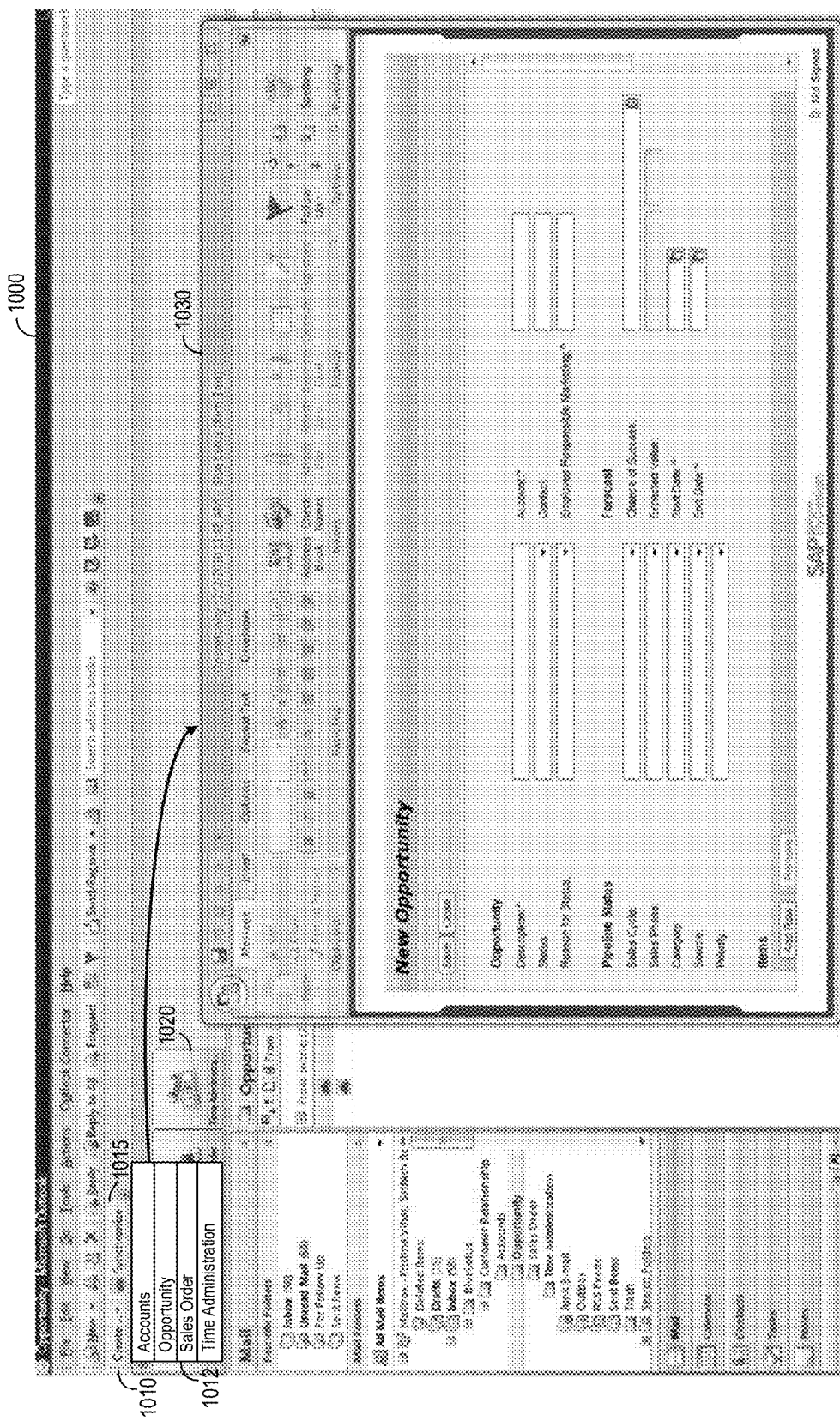
FIG. 10 is a view of a host application displaying a user interface according to some embodiments.

FIG. 10 is a view to describe S920 through S940 according to some embodiments. Specifically, main Outlook interface 1000 is displayed upon execution of the application at S920. Interface 1000 includes controls 1010, 1015 and 1020 added by container 810. Each of controls 1020 corresponds to a UI package of UI bundle 800, and is selectable to cause the display of a list of corresponding previously-saved UI package instances. In this regard, data of UI package instances is stored in data store 840, while the original UI packages of bundle 800 are preserved in order to provide a default (e.g., blank) form in a case that a user wishes to create a new form.

Create control 1010 may be selected to create such a form. In the illustrated example, the user has previously selected Opportunity control 1020, causing the display of a list of previously-saved opportunity forms in a main panel of interface 1000. The user then selects Create control 1010 to display dropdown menu 1012, which lists the UI packages available for instantiation. The user has selected Opportunity from menu 1012 to issue the command received at S930. Interface 1030 is then rendered to include the layout of the UI package of UI bundle 800 which is associated with an Opportunity form. Although interface 1030 shows a form which does not include any data, the form may display any default data that is stored in the corresponding UI package of UI bundle 800. The layout is rendered within a window of the host application (i.e., a Microsoft Outlook window) to demonstrate integration of the form therewith.

Figure 11:
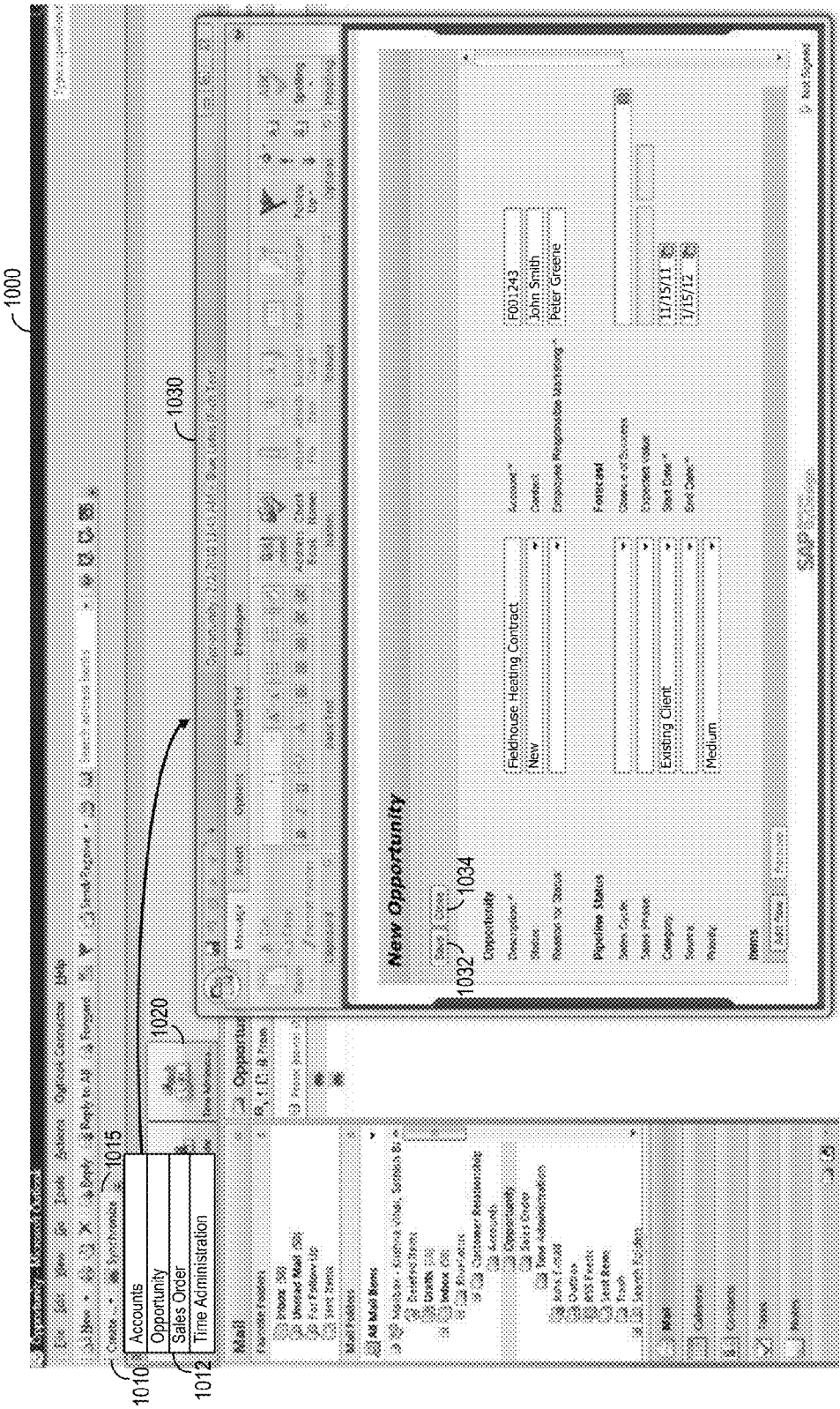
FIG. 11 is a view of a host application displaying a user interface according to some embodiments.

Returning to process 900, data is input to the rendered layout and is received at S950. FIG. 11 shows interface 1030 after the input of data into several of the displayed fields. Next, it is assumed that the user then selects Save control 1032. This selection causes storage of the data in conformance with the business object model (i.e., because each field of the layout may map to fields of a message business object) at S960. The data is stored in a local storage of the client device such as data store 840. The user may select Close control 1034 to close interface 1030 before or after saving the input data.

A command to synchronize the storage with backend service provider 850 is received at S970. The command may be issued in response to user selection of Synchronize control 1015, detection of an online connection to backend service layer 850, or any other suitable event. As a result, the data of data store 840 is synchronized with backend service provider 850. The data is easily extracted and processed as one or more messages, since the data is stored in conformance with a message object known to backend service provider 850.

Some embodiments of process 900 thereby provide users with the ability to enter data for consumption by backend service layer 850 while in an offline mode. Advantageously, this data may be entered from within a familiar application in some embodiments. Moreover, some embodiments leverage existing tools and runtime to consume the entered data and to design and render the forms/interfaces which receive the data.

Figure 12:
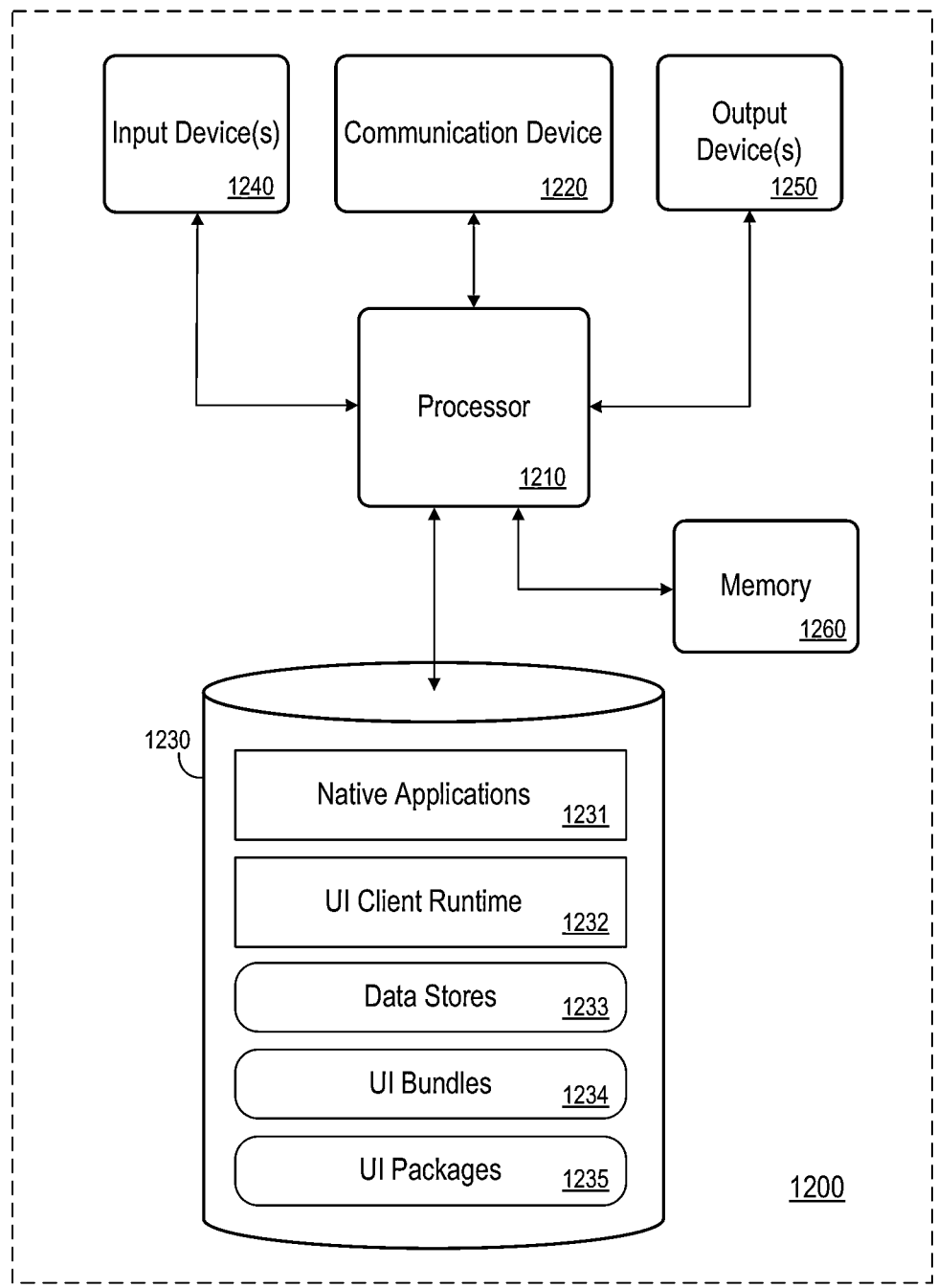
FIG. 12 is a block diagram of a computing device system according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of UI client 130. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

As shown, data storage device 1230 may store native applications 1231 such as a word processing program, an e-mail client, a spreadsheet application, a Web browser, and any other suitable applications. Also stored is UI client runtime 1232 which may be executed to render forms/interfaces which have been designed in view of a UI model and a BO model of a backend service layer. With respect to the above-described implementations, data storage device 1230 may also store data stores 1234 associated with native applications 1231 or other containers, UI bundles 1235 and UI packages 1236. Data storage device 1230 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A computer-implemented method comprising:
receiving, by a client device, a file comprising a user interface package generated by a backend service provider that defines interfaces according to a user interface model and a business object model of the backend service provider, the user interface package comprising layout information, including user interface elements, conforming to the user interface model of the backend service provider and a data model conforming to the business object model of the backend service provider;
rendering, by the client device while in an offline mode disconnected from the backend service provider, a layout based on the user interface model and the data model as defined by the user interface package received from the backend service provider;
receiving, by the client device while in the offline mode disconnected from the backend service provider, data input to the rendered layout at the client device;
storing, by the client device, the data input to the rendered layout in conformance with the data model of the user interface package received from the backend service provider, the storing including mapping fields of data input to the rendered layout to fields of the business object model of the backend service provider; and
transmitting the data, stored in conformance with the data model of the user interface package, from the client device to the backend service provider, the transmitting including detecting a command to synchronize the storage with the backend service provider; and synchronizing the data in conformance with the business object model with the backend service provider.

2. A computer-implemented method according to claim 1, wherein rendering the layout further comprises:
executing a host application at the client device;
receiving a command in the host application to open a form associated with the user interface package within the host application; and rendering the layout in the host application based on the user interface model.

3. A computer-implemented method according to claim 1, wherein storing the data at the client device further comprises:
storing the data in conformance with the business object model in a storage associated with the host application.

4. A computer-implemented method according to claim 1, wherein receiving the user interface package comprises:
receiving a user interface bundle comprising a plurality of user interface packages at the client device, each of the plurality of user interface packages comprising respective layout information and a respective data model, the respective layout information conforming to the user interface model of the backend service provider and the respective data model conforming to the business object model of the backend service provider,
wherein rendering the layout further comprises:
executing a host application at the client device; and
displaying a control associated with each of the plurality of user interface packages, and
wherein receiving the command in the host application comprises:
receiving a selection of one of the plurality of controls associated with the user interface package.

5. A computer-implemented method according to claim 4, wherein storing the data at the client device further comprises
storing the data in conformance with the business object model in a storage associated with the host application.

6. A non-transitory computer-readable medium storing processor executable instructions thereon, the medium comprising:
instructions to receive by a client device, a file comprising a user interface package generated by a backend service provider that defines interfaces according to a user interface model and a business object model of the backend service provider, the user interface package comprising layout information, including user interface elements, conforming to the user interface model of the backend service provider and a data model conforming to the business object model of the backend service provider;
instructions to render, by the client device while in the offline mode disconnected from the backend service provider, a layout based on the user interface model and the data model as defined by the user interface package received from the backend service provider;
instructions to receive, by the client device while in the offline mode disconnected from the backend service provider, data input to the rendered layout at the client device;
instructions to store, by the client device, the data input to the rendered layout in conformance with the data model of the user interface package received from the backend service provider, the storing including mapping fields of data input to the rendered layout to fields of the business object model of the backend service provider;
instructions to transmit the stored data from the client device to the backend service provider
instructions to detect a command to synchronize the storage with the backend service provider; and
instructions to synchronize the data in conformance with the business object model with the backend service provider.

7. A medium according to claim 6, further comprising:
instructions to execute a host application at the client device;
instructions to receive a command in the host application to open a form associated with the user interface package within the host application; and
instructions to render the layout in the host application based on the user interface model.

8. A medium according to claim 6, further comprising:
instructions to store the data in conformance with the business object model in a storage associated with the host application.

9. A medium according to claim 6, further comprising:
instructions to receive a user interface bundle comprising a plurality of user interface packages at the client device, each of the plurality of user interface packages comprising respective layout information and a respective data model, the respective layout information conforming to the user interface model of the backend service provider and the respective data model conforming to the business object model of the backend service provider,
instructions to execute a host application at the client device; and
instructions to display a control associated with each of the plurality of user interface packages, and
instructions to receive a selection of one of the plurality of controls associated with the user interface package.

10. A medium according to claim 9, wherein the code to store the data at the client device further comprises
instructions to store the data in conformance with the business object model in a storage associated with the host application.

11. A computing system comprising:
a memory storing processor-executable program code; and
a processor to execute the processor-executable program code to cause the system to:
receive a file comprising a user interface package generated by a backend service provider that defines interfaces according to a user interface model and a business object model of the backend service provider, the user interface package comprising layout information, including user interface elements, conforming to the user interface model of the backend service provider and a data model conforming to the business object model of the backend service provider;
receiving, by the client device while in the offline mode disconnected from the backend service provider, data input to the rendered layout at the client device;
render, while in an offline mode disconnected from the backend service provider, a layout based on the user interface model and defined by the user interface package received from the backend service provider;
receive, while in the offline mode disconnected from the backend service provider, data input to the rendered layout;
store the data input to the rendered layout in conformance with the data model of the user interface package received from the backend service provider, the storing including mapping fields of data input to the rendered layout to fields of the business object model of the backend service provider; and
transmit the stored data to the backend service provider, the transmission of the data from the client device to the backend service provider including detection of a command to synchronize the storage with the backend service provider; and synchronization of the data in conformance with the business object model with the backend service provider.

12. A system according to claim 11, wherein rendering of the layout comprises:
- execution of a host application at the client device;
- reception of a command in the host application to open a form associated with the user interface package within the host application; and
- rendering of the layout in the host application based on the user interface model.

13. A system according to claim 11, wherein storage of the data at the client device further comprises:
- storage of the data in conformance with the business object model in a storage associated with the host application.

14. A system according to claim 11, wherein reception of the user interface package comprises:
- reception of a user interface bundle comprising a plurality of user interface packages at the client device, each of the plurality of user interface packages comprising respective layout information and a respective data model, the respective layout information conforming to the user interface model of the backend service provider and the respective data model conforming to the business object model of the backend service provider, wherein rendering of the layout further comprises:
execution of a host application at the client device; and
display of a control associated with each of the plurality of user interface packages, and wherein reception of the command in the host application comprises:
reception of a selection of one of the plurality of controls associated with the user interface package.

15. A system according to claim 14, wherein storage of the data at the client device further comprises
- storage of the data in conformance with the business object model in a storage associated with the host application.

* * * * *